(12) United States Patent
Gressel et al.

(10) Patent No.: US 6,749,115 B2
(45) Date of Patent: Jun. 15, 2004

(54) DUAL PROCESSOR TRUSTED COMPUTING ENVIRONMENT

(75) Inventors: Carmi David Gressel, Mobile Post Negev (IL); Nimrod Bayer, Beer Sheva (IL); Lev Vichodets, Beer Sheva (IL)

(73) Assignee: M-Systems Flash Disk Pioneers Ltd., Beer Sheva (IL)

( * ) Notice: Subject to any disclaimer, the term of this patent is extended or adjusted under 35 U.S.C. 154(b) by 74 days.

(21) Appl. No.: 09/871,152

(22) Filed: May 31, 2001

(65) Prior Publication Data

US 2002/0070272 A1 Jun. 13, 2002

(51) Int. Cl.[7] ............................................. G06K 5/00
(52) U.S. Cl. .............................................. 235/382
(58) Field of Search ................. 235/382, 487; 364/754; 705/18, 64, 67, 72, 75; 707/9; 709/100

(56) References Cited

U.S. PATENT DOCUMENTS

| | | | |
|---|---|---|---|
| 4,742,215 A | | 5/1988 | Daughters et al. |
| 5,065,429 A | * | 11/1991 | Lang ............................ 705/56 |
| 5,513,133 A | | 4/1996 | Cressel et al. ............... 364/754 |
| 5,519,843 A | | 5/1996 | Moran et al. ................ 395/430 |
| 5,544,246 A | * | 8/1996 | Mandelbaum et al. ........ 705/65 |
| 5,742,530 A | | 4/1998 | Gressel et al. ............... 364/746 |
| 6,249,869 B1 | * | 6/2001 | Drupsteen et al. ........... 713/172 |

FOREIGN PATENT DOCUMENTS

| | | | |
|---|---|---|---|
| WO | 98/50851 | 11/1998 | ............ G06F/7/37 |
| WO | 99/01848 | 1/1999 | ............ G07F/7/08 |
| WO | 99/26184 | 5/1999 | ............ G06K/7/01 |
| WO | 00/42484 | 7/2000 | |
| WO | 00/48416 | 8/2000 | ............ H04Q/7/32 |

OTHER PUBLICATIONS

Kathleen Ohlson, "Microsoft Java Machine could enable 'attack applets'", Dec. 28, 2000; https//www.cnn.com/TECH/computing/9909/02/javabug.ldg/index.html.

Pierre Girard et al., "New Security Issues Raised by Open Cards", Information Security Technical Report, vol. 4, pp. 19–27, Elsevier, May 1999.

* cited by examiner

Primary Examiner—Thien M. Le
Assistant Examiner—Lisa M. Caputo
(74) Attorney, Agent, or Firm—Darby & Darby (57) ABSTRACT

The present invention relates to an architectural development of a monolithic integrated circuit with dual public key cryptographic protected central processing units in a computing device, with large external non-volatile reprogrammable memory enabled to perform cryptographically controlled transactions for identification of persons, computers, and or mobile devices, for controlling access to physical and computational devices, for multivendor monetary transactions, and to serve as a safe depository of data, especially useful for encapsulating applications, programmed and updated by varied entitled programmers such that one or many vendors' applications are mutually exclusive, and virtually unable to corrupt, infringe, change or affect other vendor applications.

48 Claims, 10 Drawing Sheets

DUAL PROCESSOR TRUSTED COMPUTING ENVIRONMENT

FIELD OF THE INVENTION

The present invention relates to secured multi-application programming on a dual component electronic computing device.

BACKGROUND OF THE INVENTION

Prior art is described in applicant's U.S. Pat. Nos. 5,513,133, 5,742,530, WO 98/50851, WO99/26184 and WO 00/42484. Other prior art is described in U.S. Pat. No. 4,742,215, and in WO 00/48416, and WO 99/01848 and in an article by Pierre Girard and Jean-Louis Lanet, from Gemplus International, "New Security Issues Raised by Open Cards", Information Security Technical Report, vol. 4, pp. 19–27, Elsevier, May 1999 hereinafter Girard.

SUMMARY OF THE INVENTION

Computing platforms intended for electronic commerce or for storing and processing data for other applications are constantly being attacked by competitors, vandals, and other inimical entities. The problem of devising secure systems becomes more intricate as new and more flexibile and complex modes of operation emerge. In the realm of ubiquitous computing, typically smart cards and subscriber identification modules within telephone handsets are expected to allow the execution of programs originated by a plurality of entities, and, as described in the article by Girard et.al. supra even to allow the loading of new application programs when the system is in service in the field. Another emerging need is to combine processing and security features with the capability of storing significant amounts of data on small size devices such as the device disclosed in the applicant's U.S. Pat. No. 5,519,843. While solutions have been proposed for insuring security in such platforms, as described in the section about the background of the invention supra, the extent of security insured in actual fact is largely unknown, because attacks and methods for breaking security arrangements are not always foreseen. The prevalent usage of a single processing engine which serves both for executing application programs that cannot enjoy the same level of trust as the inner core of the system as well as for executing the operations belonging to the inner core, as done in current art designs, in principle decreases the level of confidence about the security of the system. More confidence about the security of the system can be gained by defining logical borders between components and sub-modules of the system and by defining and adhering to formal rules governing the interactions between the components and sub-modules. The current invention shows how separation and logic borders between components and sub-modules of the system can be defined and embodied in a material realization, in association with security rules, where one of the methods being adopted to accomplish the separation being the usage of at least two processing engines instead of a single processing engine.

It is the purpose of the current invention to provide a secure computation system achieving the same level of security accomplished by closed, rigid, more rudimentary, security application modules (SAMs) while providing an open and flexible environment, operable to serve multiple applications associated with multiple agents and with remote downloads in the field. Further objects of the invention are to provide a system operable to control secured repositories of data and programs, to support protected mutually exclusive execution of programs, to control the operation and to store the results of electronic value applications and transactions, to enable authorized downloading of data for storage, to enable authorized downloading of programs for execution. A further object of the invention is to provide a design for a secure data module implementable on small mobile devices. A further object of the invention is to provide a design for a secure data module containing "off the shelf" prior art core of a more rudimentary security application module (SAM), integrated with circuitry serving for implementing the complementary part of the system. A further object of the invention is to create a secure data module where symmetric key and public key cryptographic techniques work in a closed tamper resistant environment. A further object of the invention is to create a secure data module integrated with physical devices for confidentially authenticating a user, typically fingerprint and PIN (Personal Identification Number) readers. A further object of the invention is to create a secure data module compliant with existing and forthcoming standardization, as described in the section "background of the invention" supra. In one typical implementation, the system is imbedded within a wireless communication device. In a further typical use, the system is operable to support credit or debit charge card public key protected clearance scheme. In a further typical use, the system serves as a mobile agent for airlines including of an updatable repository of air flight schedules, automatic airline reservation and ticketing scheme with payment implemented using a PKI charge clearance network.

In a preferred embodiment of the invention, the system includes a first component operable to insure authorized access to the secured repositories of data and programs, to manage and control the secured repositories of data and programs, to insure the integrity of the secured repositories of data and programs, and to prevent one application from utilizing, scrutinizing or modifying another application, and a second component operable to execute authorized applications, the first and second components operating in parallel.

In another preferred embodiment, portions of a complete program are being fetched during run time from the repositories of programs with access to locations within the repositories of programs not allowed for the program being blocked by a firewall, the firewall including a mask of control values corresponding to a plurality of segments within the repositories of programs and controlled by the first component.

In a preferred embodiment of the invention, the system is imbeded within a single monolithic microelectronic integrated circuit. In another preferred embodiment, traffic of information between parts of the system that do not reside on a common monolitic IC chip is encrypted.

In a preferred embodiment of the invention, the internal circuitry is protected by physical tamper resist methods and containing D/A (Digital to Analog) converters, operable to hide data contents, typically audio signals in a digital format within the data repositories while exporting the contents in an analog form only.

DETAILED DESCRIPTION OF THE INVENTION

Preferred Formal Embodiments

Figure 1:
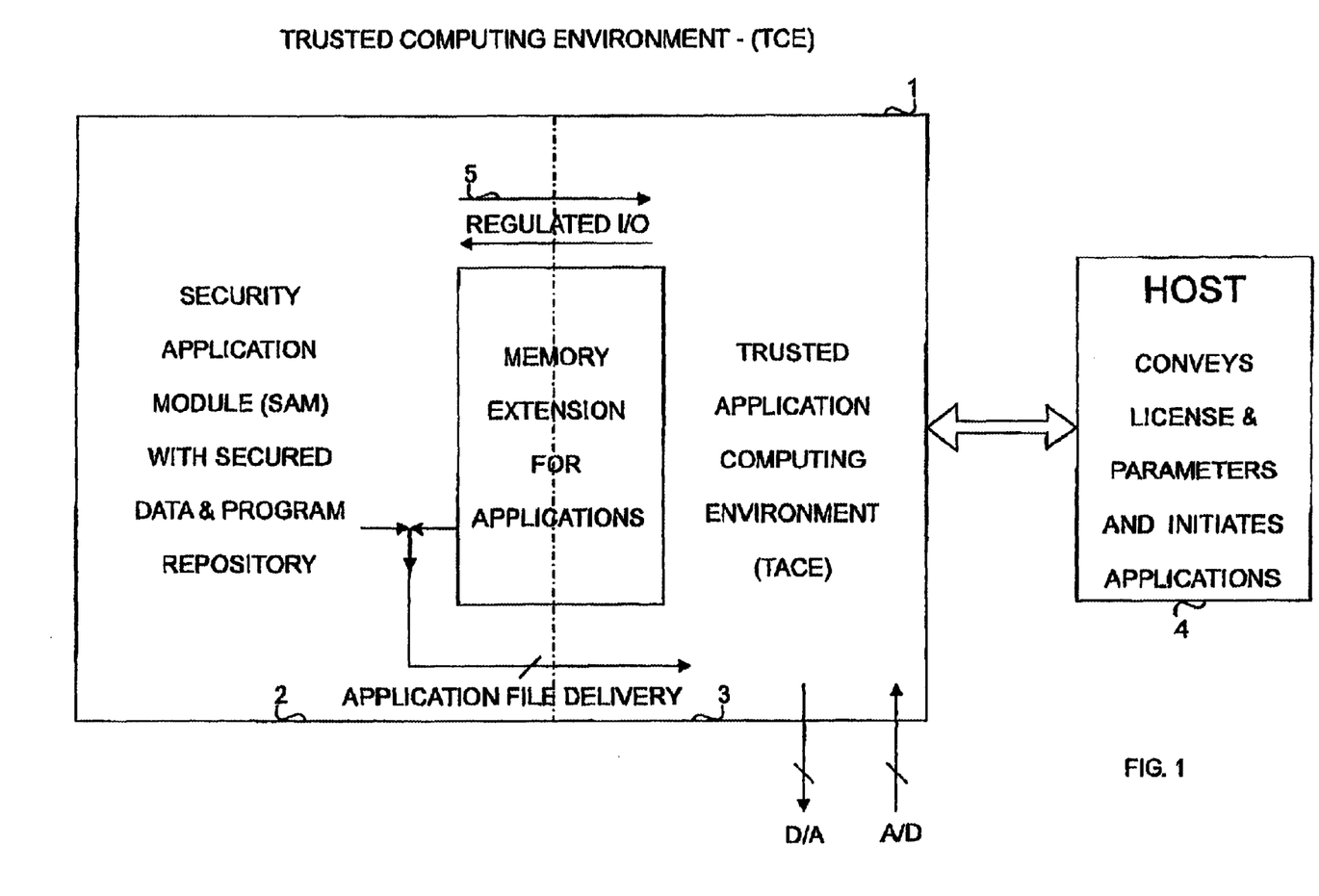
FIG. 1 is a generic simplified overview block representation of preferred embodiments of a structure for a dual processing trusted computing environment (TCE).

The computing system illustrated in FIG. 1 is a simplified block diagram of a trusted computing environment (TCE) 1, interfaced to a Host, 4. Said host, preferably endowed with Public Key Infrastructure (PKI), can be a simple or composite computing system operable to authorize, after positive PKI identification, transactions, data transfers, to and from a protected data repository and to authorize execution of applications in the Trusted Application Computing Environment, (TACE) 3, originated from application issuers recognized by the TCE Security Application Module (SAM), 2.

The SAM is preferably a PKI protected module, operable to perform sensitive transactions, to negotiate and approve access to a PKI authorized application, and to convey access to the particular application data prescribed in the PKI negotiation between the TCE SAM and the Host Access is granted to a complete or partial portion of the application according to the priority and conditions, which are provided in the Host PKI Certificate, issued by the Application Certification Authority.

The PKI Master typically communicates and mutually authenticates conditions of participation in an application with the Host, prior to executing an application. Files for applications which are computed in the TACE, 3, are either downloaded by the TCE SAM from a larger memory repository, typically from a NAND type Flash memory, typically into executable volatile RAM or in another preferred embodiment based on NOR type Flash memory, authorized blocks of the address enable are unmasked for the specific application for direct CPU execution.

During the process of the application session, the computing environment is authorized to conduct financial negotiations with the TCE SAM, virtually as a trusted smart card reader would negotiate with a PKI smart card's SAM. The transactions between the TACE and the SAM are typically executed in ISO 7816 type formats through the security I/O buffer, 5.

Typically, all downloads of Application Files, are PKI negotiated and written into memory exclusively by the TCE SAM. Typically, electronic commerce and purse transactions are executed by the TCE SAM and all changes in non-volatile purses are written in non-volatile memory by the TCE SAM.

In a preferred embodiment, the TACE is operative to execute biometric and imaging computations, collecting data via an analog to digital interface. Results of large scale computations are typically output in analog mode operable from a digital to analog converter, D/A, and in digital form to the Host and/or to the TCE SAM.

The computing system illustrated in FIG. 1 is a simplified block diagram a trusted computing environment, (TCE) 1, interfaced to a Host, 4. A Public Key Infrastructure (PKI) Host can be a simple or composite computing system operable to authorize, after positive PKI identification, transactions, data transfers, to and from a defined protected application directory and to authorize execution of applications in the Trusted Application Computing Environment, (TACE) 3, from an application issuer recognized by the TCE Security Application Module (SAM), 2.

Figure 2:
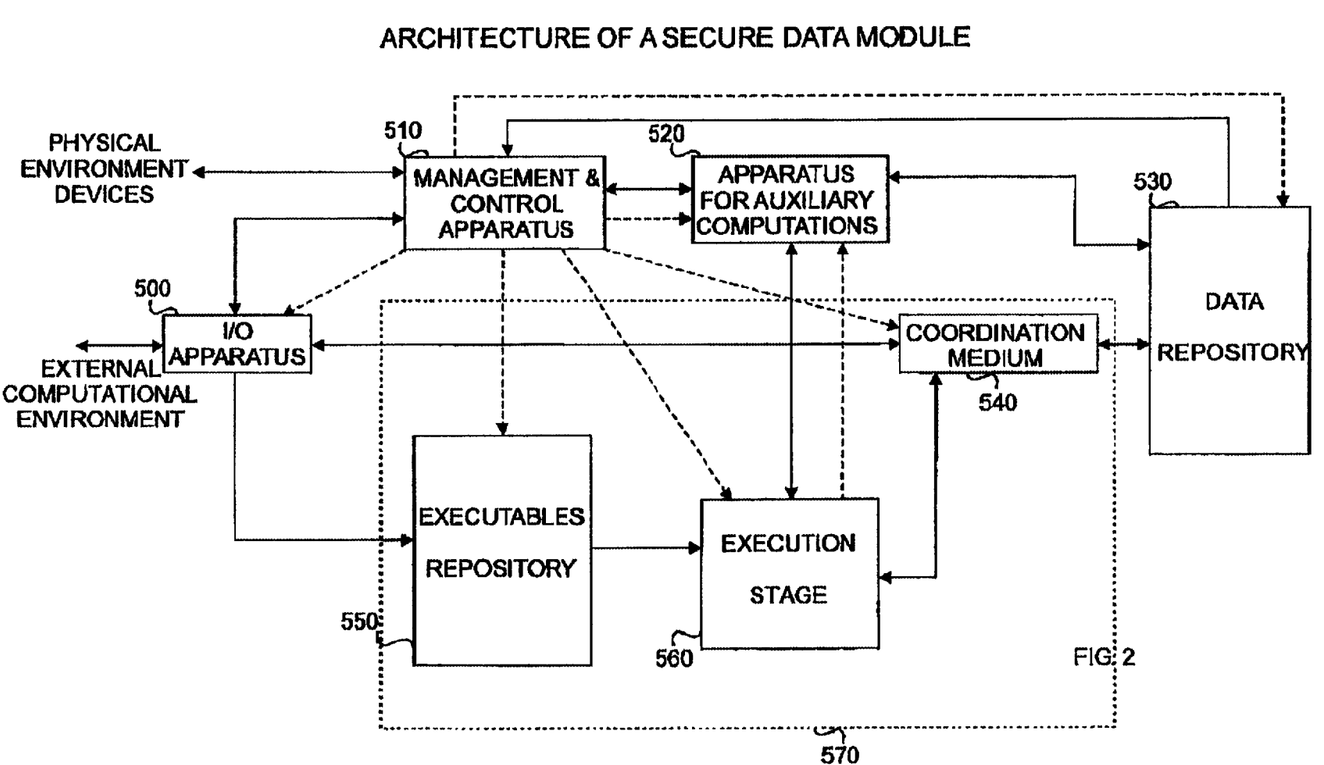
FIG. 2 is a simplified block diagram of an architecture of a secure data module serving as a trusted computing environment, showing a formal division of the system into sub-modules and their interactions.

In FIG. 2 we describe an architecture of a TCE (Trusted Computing Environment) secure data module that enhances the capabilities of a SAM cryptocomputer core by appending an environment for application execution. The aim is to preserve the same level of security that is attained by the closed, typically rudimentary, SAM core which has limited accommodation for loadable applications, and in addition to ensure hardware separation between different applications. To achieve this aim we propose methods by which 1) the plurality of functions of the TCE system are identified at formal levels, and the system is divided accordingly into sub-modules;

2) the plurality of interactions between the sub-modules are defined at the formal level, and security assumptions of these interactions are set;

3) the design is translated into an integrated circuit embodiment, using computer simulations, in a mode that ensures that assumptions on the interaction between submodules, as defined in the more formal level, are implemented in a physical embodiment.

This formalization produces a design, which typically satisfies a concise set of security-elated assumptions. The activation of this method generates an architecture that comprises 1) sub-modules that typically are operable to fulfill the function of a closed, rudimentary SAM core, and 2) sub-modules that typically are operable to accommodate loadable applications, such that each of the above two groups of sub-modules typically constitutes an autonomous computing environment, including an autonomous processing engine. A suitable design in the formal level includes the sub-modules of FIG. 2, shown with their typical interactions. A description of the plurality of functions of these sub-modules, and of the interactions between sub-modules including the security-related assumptions follows. In the description we distinguish between a "data interaction", which is represented by a fill line in FIG. 2, and a "control interaction", which is represented by a dashed line. The sub-modules enclosed within the dashed box 570 in FIG. 2 are typically appended to the SAM core to accommodate the loadable applications.

I/O Apparatus (500)

Interfaces between the secure data module and the external computational environment, typically a host terminal, a telephone handset, a TV set top box, or a smart card reader. The data traffic that flows via this sub-module may include commands and responses exchanged between the external computational environment and the management and control apparatus (510); data exchanged between the external computational environment and the data repository (530); and loadable applications transferred from the external computational environment to the EXECUTABLES REPOSITORY (550).

Management & Control Apparatus (510)

Manages and controls the plurality of resources in the system, negotiates with the external computational environment, and communicates with physical environment devices, typically a fingerprint sensor or another user authentication device. In a preferred embodiment, all or part of the functionality of the management and control apparatus is typically implemented by the processing engine of the SAM core, and the complementary part is implemented by the processing engine of the appended environment for loadable applications.

Apparatus for Auxiliary Computations (520)

Performs specialized computations, such as those needed for cryptographic operations.

Data Repository (530)

Stores data on a non-volatile medium, typically operable to be accessed and modified directly or indirectly by authorized commands and applications.

Coordination Medium (540)

Is typically operable to buffer between the data repository (530), and the external computational environment and execution stage (560).

Executables Repository (550)

Is typically operable to retain authorized executables on a non-volatile medium.

Execution Stage (560)

Is operable to provide an infrastructure for executing an application. In a preferred embodiment, this infrastructure typically includes a processing engine, a random access memory for code and data, and system software tat typically includes high or intermediate level language interpreters.

Data interaction between the EXTERNAL COMPUTATIONAL ENVIRONMENT and the I/O APPARATUS:
 Role: To transfer commands, responses, data, and executables.

Data interaction between the I/O APPARATUS and the MANAGEMENT & CONTROL APPARATUS:
 Role: To transfer commands and responses.

Data interaction between the I/O APPARATUS and the COORDINATION MEDIUM:
 Role: To transfer data.

Security-related assumptions:
 When this interaction is operating, the interactions between the coordination medium and the data repository and execution stage are detached.

Data interaction between the I/O APPARATUS and the EXECUTABLES REPOSITORY:
 Role: To transfer executables.

Data interaction between the MANAGEMENT & CONTROL APPARATUS and the PHYSICAL ENVIRONMENT DEVICES:
 Role: Typically to transfer an authentication of the person operating the secure data module.

Data interaction between the MANAGEMENT & CONTROL APPARATUS and the APPARATUS FOR AUXILIARY COMPUTATIONS:
 Role: Typically to transfer operands and results of cryptographic and arithmetic computations.
 Security-related assumptions:
 When this interaction is operating, the interaction between the apparatus for auxiliary computations and the execution stage is detached.

Data interaction between the MANAGEMENT & CONTROL APPARATUS and the DATA REPOSITORY:
 Role: To transfer data
 Security-related assumptions:
 When this interaction is operating, the interaction between the coordination medium and the data repository is detached.

Data interaction between the APPARATUS FOR AUXILIARY COMPUTATIONS and the DATA REPOSITORY:
 Role: To transfer bulk data, typically files.
 Security-related assumptions:
 When this interaction is operating, the interaction between the coordination medium and the data depository is detached.

Data interaction between the APPARATUS FOR AUXILIARY COMPUTATIONS and the COORDINATION MEDIUM:

Data interaction between the APPARATUS FOR AUXILIARY COMPUTATIONS and the EXECUTION STAGE:
 Role: Typically to transfer operands and results of cryptographic and arithmetic computations.
 Security-related assumptions:
 When this interaction is operating, the interactions between the apparatus for auxiliary computations and the management and control apparatus and the data depository are detached.

Data interaction between the DATA REPOSITORY and the COORDINATION MEDIUM:
 Role: To transfer data.
 Security-related assumptions:
 When this interaction is operating, the interactions between the coordination medium and the I/O apparatus and the execution stage are detached.

Data interaction between the COORDINATION MEDIUM and the EXECUTION STAGE:
 Role: To transfer data and authorized requests to access data.
 Security-related assumptions:
 When this interaction is operating, the interactions between the coordination medium and the I/O system and the data repository are detached.

Data interaction between the EXECUTABLES REPOSITORY and the EXECUTION STAGE:

Role: To transfer loadable executables.

Control interaction between the MANAGEMENT & CONTROL APPARATUS and the I/O APPARATUS:

Role: To select the type of data interaction in which the I/O apparatus is engaged.

Control interaction between the MANAGEMENT & CONTROL APPARATUS and the APPARATUS FOR AUXILIARY COMPUTATIONS:

Role: To select the types of computations in which the apparatus for auxiliary computations is en, and to select in a typically dynamic manner the submodules to which the apparatus for auxiliary computations is attached.

Security-related assumptions:

The data interactions between the apparatus for auxiliary computations and all the sub-modules except of the execution stage are detached whenever the apparatus for auxiliary computations is attached to the execution stage.

Control interaction between the MANAGEMENT & CONTROL APPARATUS and the DATA REPOSITORY:

Role: To select the type of operation in which the data repository is engaged, to scrutinize the coordination medium, and to govern the attachments and detachments of the coordination medium to and from the data repository.

Security-related assumptions:

An attachment between the coordination medium and the data repository is allowed only after the coordination medium is detached from the I/O apparatus and from the execution stage, and its contents scrutinized as to verify that these contents constitute a proper and authorized command.

Control interaction between the MANAGEMENT & CONTROL APPARATUS and the COORDINATION MEDIUM:

Role: to select the submodule to which the coordination medium is attached, and to scrutinize the contents of the coordination medium when the coordination medium contains a request to access the data repository so as to verify that the request is authorized.

Control interaction between the MANAGEMENT & CONTROL APPARATUS and the EXECUTABLES REPOSITORY:

Role: To control the import of executables from the external computational environment into the executables repository.

Control interaction between the MANAGEMENT & CONTROL APPARATUS and the EXECUTION STAGE:

Role: To control the loading of executables from the executables repository into the execution stage, to set the mask serving as a firewall in the fetching of portions of an executable by the execution stage, and to order the starting or the stopping of an execution in the execution stage.

Security-related assumptions: At every moment it is defined which executable occupies the execution stage, if any, and portions of no other executable may be brought from the executables repository to the execution stage.

Control interaction between the APPARATUS FOR AUXILIARY COMPUTATIONS and the EXECUTION STAGE:

Role: To determine the operation performed by the apparatus for auxiliary computations.

Preferred Detailed Embodiments of the Formal Architecture

Figure 3:
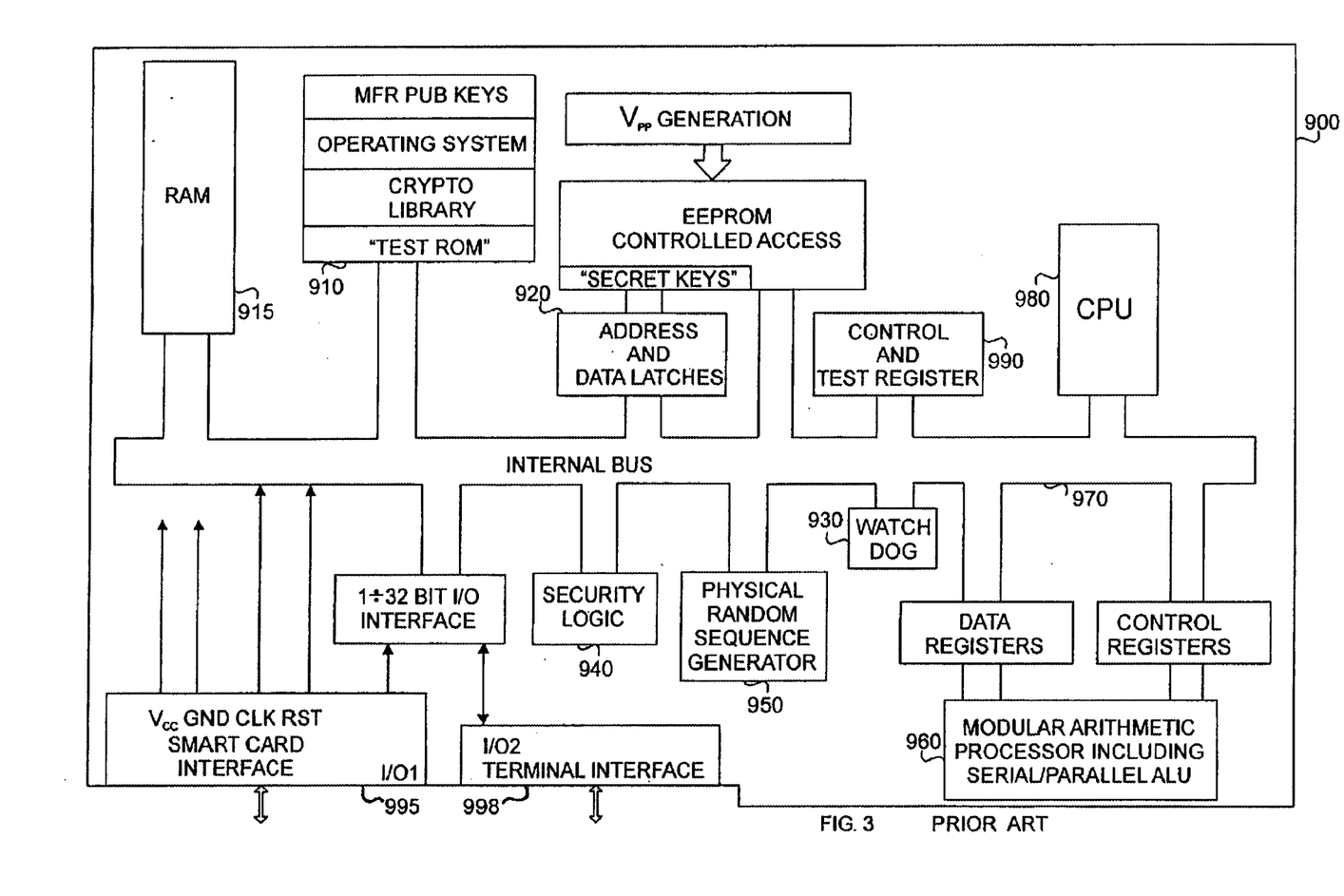
FIG. 3 is a simplified block diagram of a prior art architecture of a securable public key protected device with a closed operating environment.

FIG. 3 is a prior art architecture of a securable public key protected device with a closed operating environment, 900, typically found in smart cards. These devices are single chip cryptocomputers, capable of performing symmetric and asymmetric cryptographic functions, typically, generation of unique secret and public keys, encrypting, decrypting, authentication, and controlled access.

Such an architecture is satisfactory, if the operating system is secured and applications for use are written for host computers. The unit is a standalone safe keeper of application specific files which are addressable only by PKI authorized hosts, Each file is typically addressable only by an authorized host, under conditions specified by the host's PKI certificate. Typically the memory map is departmentalized, such that a host application programmer has no direct access to manufacturers' test code; the cryptographic library containing programs operable to perform sensitive cryptographic functions; or application specific data. Such a programmer is prevented from composing host programs to read out secret keys, and only authorized hosts may negotiate with electronic value purses or have access to confidential data files.

Security logic, 940, is operable to accelerate cryptographic functions, to allay external tampering, hacking, analysis of electronic data by operating the integrated circuit at out of scope operating conditions, and is operable to prevent an inimical entity access to parts of the memories, 910, 915, 920, internal busses, 970, or other peripherals. Control and Test Registers, 990, regulate and audit functionality of operation of peripherals and internal busses. The Watch Dog, 930, senses a nonfunctional central processing unit, CPU, 980. The Smart Card and Terminal interfaces, 995 and 998, enable communication with external terminals and readers. Random Sequence generators, 950, are operative to supply challenges to communicating devices, operable to assure that valid communication sequences are not recorded and reused by inimical devices, and to enable the cryptocomputer to generate unique secrets and secret keys. The Modular Arithmetic Processor, 960, is typically operable to execute popular public key algorithms, necessary for validation of certificates, generation and validation of electronic signatures, and for safe exchange of symmetric encryption keys.

This architecture is provably insecure if application programmers are allowed to write application programs in the operating system in 910.

Figure 4:
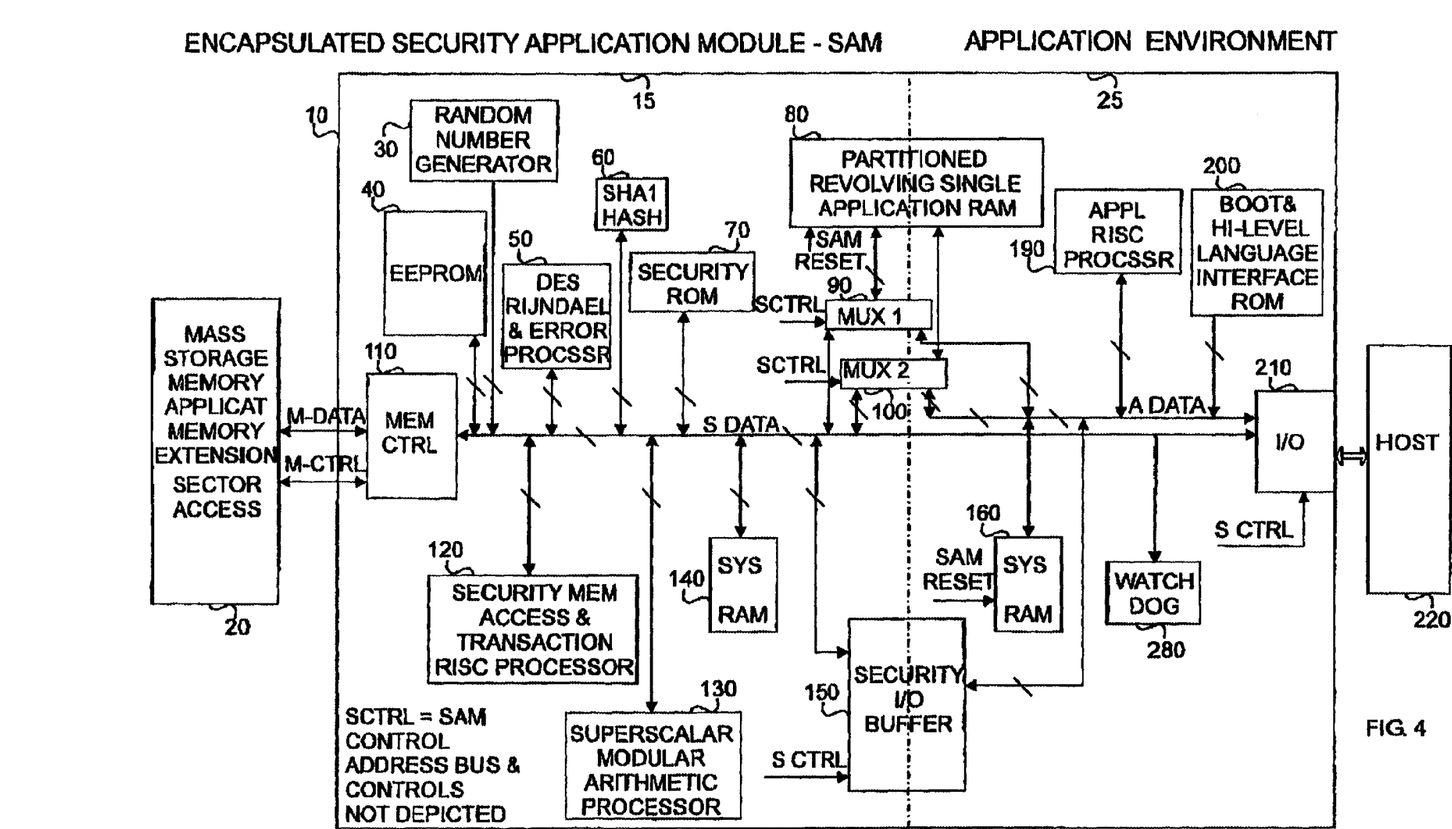
FIG. 4 is a block diagram of a double processor Public Key protected device with an appended protected environment operable to execute programs downloaded from authorized application issuers wherein issuer applications are typically stored in NAND Flash ROM.

FIG. 4 is a block diagram of a preferred embodiment of a double computing processor Public Key protected Trusted Computing Environment, TCE, 10, comprised of a security application module, SAM, 15, with an appended Trusted Application Computing Environment, TACE, 25. The TCE, 10, communicates with a Host computing device, 220, operative to activate the TCE, and to enable authorized usage of the TCE. A plurality of Host Application SAMs are typically operable to authorize downloading of application specific executable programs and data; to negotiate transactions; and to store and recover data into and from the TCE, through the input output interface, 210. The CPU, 120, is preferably a reduced instruction set computer, with peripherals similar to the prior art security processor of FIG. 3. Typical components of the TCE SAM, are the modular arithmetic processor, 130, operable to process asymmetric cryptographic methods such as RSA, elliptic curve encryption and decryption, and digital signature algorithms, necessary for authenticating cryptographic certificates, application devices, execution of value transactions, and controlling processing of applications such that authorized applications are processed singly, without allowing interaction with other applications, and invasive procedures from the host or the application environment. Cryptographic peripheral, 50, performs symmetric encryption procedures, typically used in communication between remote host devices, and for storing data in the mass storage memory, 20. Memory device, 20, typically is not part of the monolithic circuit 10, and typically stores encrypted data, precluding inimical probing of connecting electronic signals between 10 and 20. Memory Controller 110, typically converts data, which is transmitted and received from 20 in large strings, similar to sectors of data read from hard disks and floppy disks. Sector accessed mass storage components are typically page readable and block erasable NAND Flash memory. System RAMs 140 and 160 are operative to maintain program functionality of the dual CPU units. The SHA1 Hash peripheral, 60, performs a one way function on long strings of data, operative to compress long strings of data to a 160 bit of data string, for public key signatures, executed in 130. The ROM peripheral, 70, is operative to contain all operational programs in the TCE SAM, including drivers for the cryptographic devices, drivers to store data in the electrically erasable and programmable read only memory, 40 and in the mass storage memory 20. The TCE SAM has its own data bus, S DATA, and an address bus, which is not depicted. A plurality of control signals, each designated SCTRL, are operative to switch devices to limit the access of the application environment, 25, to specifically defined programs and data. Random Access Partitioned Revolving Single Application Memory, 80, is the platform for executable TACE application programs. Typically, the TCE SAM transfers application programs into one section of 80, whilst the application environment typically executes application specific programs in parallel from a second alternate section of 80. Both prior to initiating an application session, and following an application session, typically, the TCE SAM Resets are operative to erase all residual data in volatile memories 80 and 160. In a typical application session the TCE SAM and the TACE application environment operate in parallel. Interactive communication between the two computing components is through the Security I/O Buffer, 150, typically using only predefined security commands, and access control to memory storage in the SAM and mass storage device for both reading and writing data, and controlling SAM negotiation functions. The Application RISC Processor, 190, typically processes an initial boot executed from ROM, 200, on the application environment in preparation for executing a SAM transmitted application session, and subsequently processes the authorized session typically written in a higher level language, typically interpreted in whole or in part by the interface program in 200. The Watch Dog, 280 is typically operative to sense a faulty sequence of commands in the TCE SAM, signifying that the TCE SAM has lost control of an application session. Typically, after sensing that the TCE SAM ceases to address the Watch Dog after a defined number of CPU clock cycles, 280 is operative to reset the TCE, 10.

Figure 5:
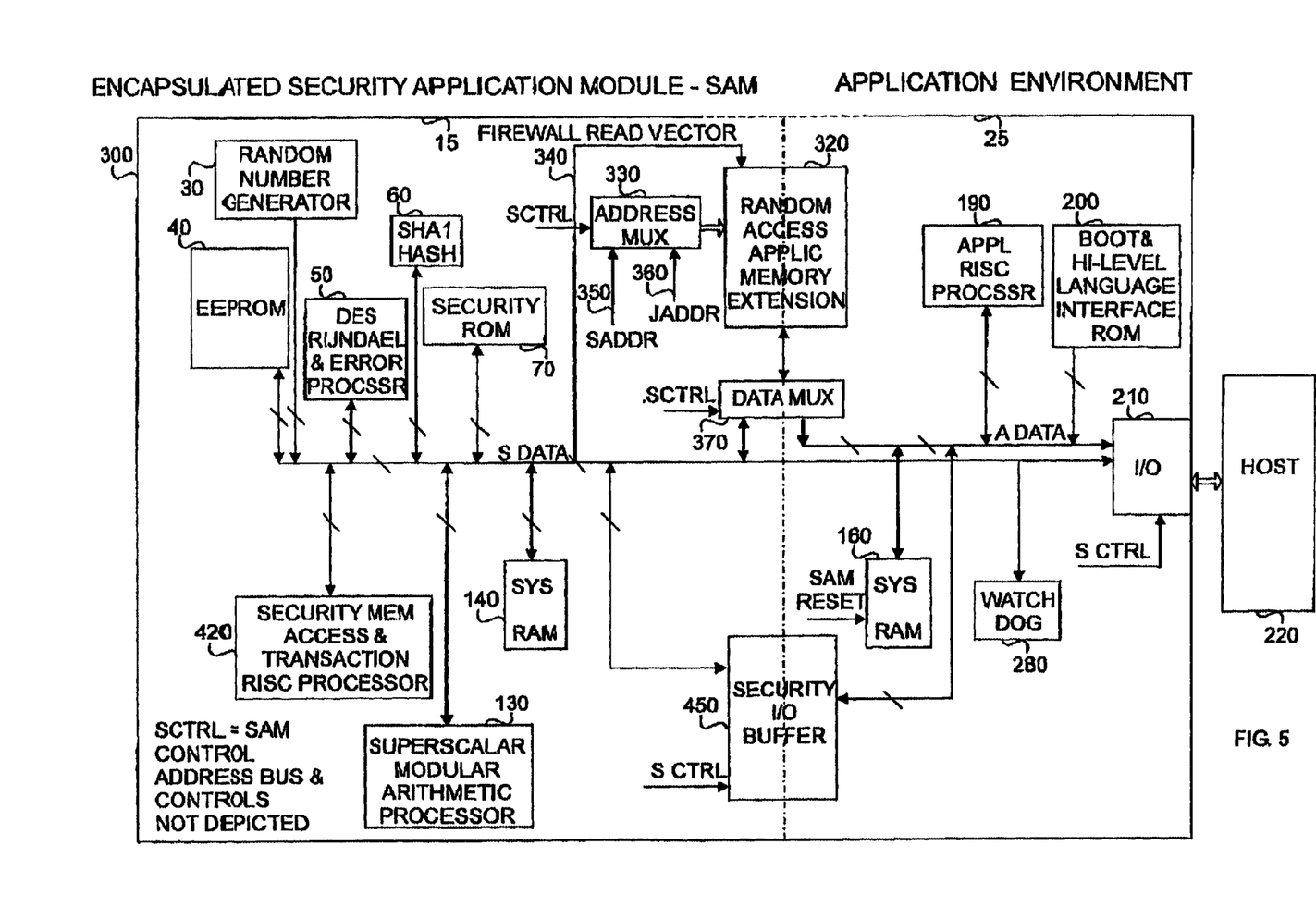
FIG. 5 is a block diagram of a double processor Public Key protected device with an appended protected environment operable to execute programs downloaded from authorized application issuers wherein issuer applications are typically stored in NOR Flash ROM.

FIG. 5 is a block diagram of a preferred embodiment of a double computing processor Public Key protected Trusted Computing Environment, TCE, 300, comprised of a security application module, SAM, 15, with an appended Trusted Application Computing Environment, TACE, 25. The TCE, 300, communicates with a Host computing device, 220, operative to activate the TCE, and to enable authorized usage of the TCE. The preferred embodiment of FIG. 5 is differentiated from FIG. 4 in that the mass storage device of FIG. 5, 320, is operable to be executable read only memory, freely accessed randomly. The CPU, 190, typically a RISC processor, is operable to execute programs directly from such memory, precluding the necessity of downloading programs into executable RAM memory, as in 80 of FIG. 4. As in FIG. 4, access to application memory typically is limited to a specific PKI protected application, whole or in part. In this preferred embodiment, Firewall Read Vector, 340, is typically prepared by the TCE SAM, programmed to enable only those parts of the specifically authorized application prescribed by the Application Certification Authority in the Host's application certificate. The TACE, 25, is enabled to read and execute commands from the ROM memory, 320, subsequent to the TCE SAM switching the Address Mux, 330, to accept JADDR address signals.

A plurality of Host Application SAMs are typically operable to authorize downloading of application specific executable programs and data; to negotiate transactions; and to store and recover data into and from the TCE, through the input output interface, 210. The CPU, 420, is preferably a reduced instruction set computer, with peripherals similar to the prior art security processor of FIG. 3. Typical components of the TCE SAM, are the modular arithmetic processor, 130, operable to process asymmetric cryptographic methods such as RSA, elliptic curve encryption and decryption, and digital signature algorithms, necessary for authenticating cryptographic certificates, application devices, execution of value transactions, and controlling processing of applications such that authorized applications are processed singly, without allowing interaction with other applications, and invasive procedures from the host or the application environment. Cryptographic peripheral, 50, performs symmetric encryption procedures, typically used in communication between remote host devices.

Executable mass storage component, 320 is typically byte or word readable and block erasable NOR Flash memory. System RAMs 140 and 160 are operative to maintain program functionality of the dual CPU units. The SHA1 Hash peripheral, 60, performs a one way function on long strings of data, operative to compress long strings of data to a 160 bit of data string, for public key signatures, executed in 130. The ROM peripheral, 70, is operative to contain all operational programs in the TCE SAM, including drivers for the cryptographic devices, drivers to store data in the electrically erasable and programmable read only memory 40, and in the mass storage executable memory, 320. The TCE SAM has its own data bus, S DATA, and an address bus, which is not depicted. A plurality of control signals, each designated SCTRL, are operative to switch devices to limit the access of the application environment, 25, to specifically defined programs and data.

Both prior to initiating an application session, and following an application session, typically, the TCE SAM Resets are operative to erase all residual data in volatile memory 160. In a typical application session the TCE SAM and the TACE application environment operate in parallel. Interactive communication between the two computing components is through the Security I/O Buffer, 450, typically using only predefined security commands, and access control to memory storage in the SAM and mass storage device for both reading and writing data, and controlling SAM negotiation functions.

The Application RISC Processor, 190, typically processes an initial boot executed from ROM, 200, on the application environment in preparation for executing a SAM transmitted application session, and subsequently processes the authorized session typically written in a higher level language, typically interpreted in whole or in part by the interface program in 200. The Watch Dog, 280 is typically operative to sense a faulty sequence of commands in the TCE SAM, signifying that the TCE SAM has lost control of an application session. Typically, after sensing that the TCE SAM ceases to address the Watch Dog after a defined number of CPU clock cycles, 280 is operative to reset the TCE, 300.

Figure 6:
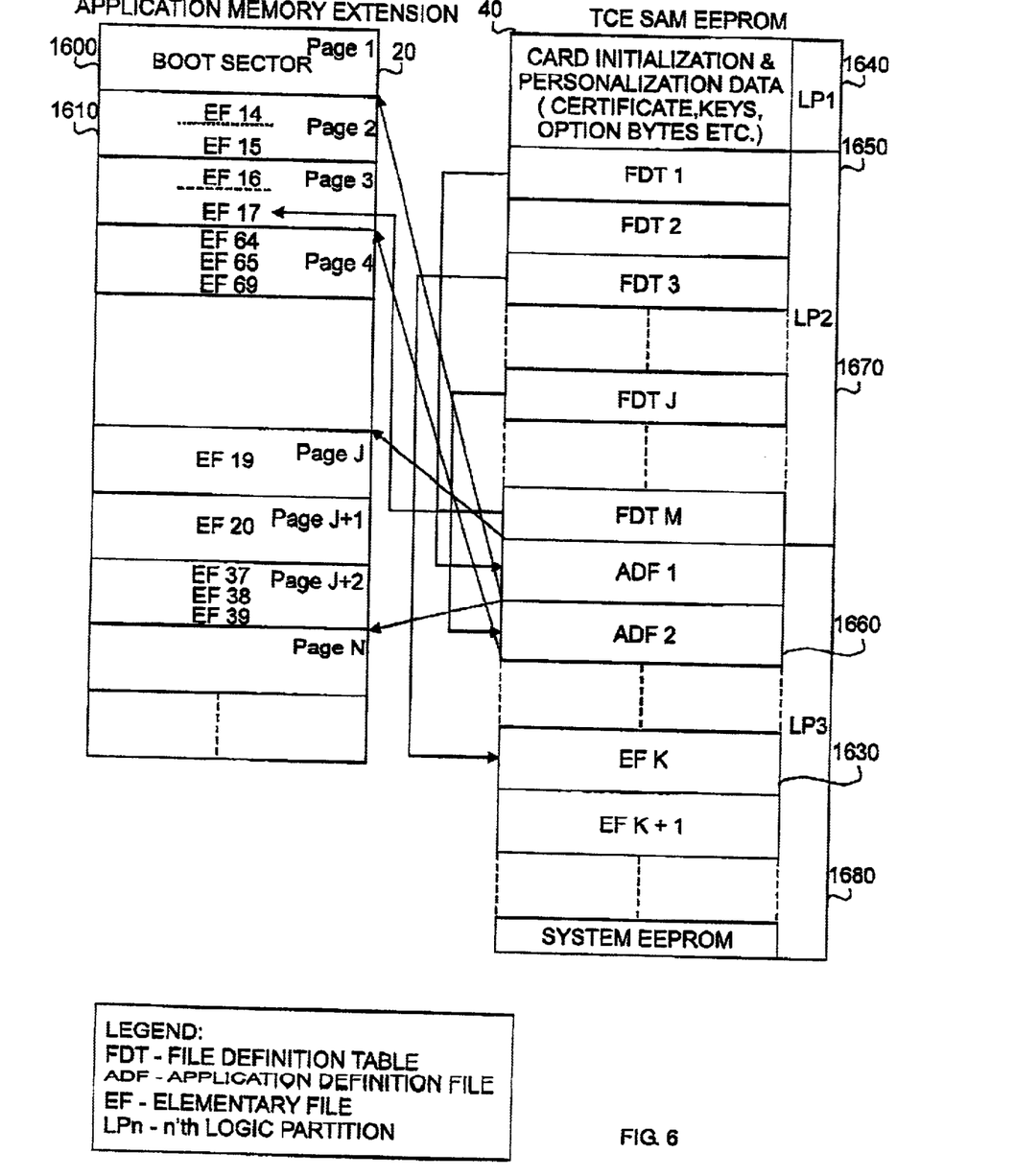
FIG. 6 is an extended file structure with a memory storage extension derived from a mature prior art closed Public Key Protected EEPROM application file structure.

FIG. 6 presents a preferred embodiment of a file system in the Trusted Computing Environment's (TCE) EEPROM, 40. The EEPROM is structured into a plurality of Directories. Each application is a directory of typically contiguous files. The Page 1 section of the Application Memory Extension, 20, typically comprises a Boot Sector 1600.

Files are defined by an entry in the File Definition Table (FDT), 1650. The entry describes the file name, type, address, file size and the working mode. Elementary Files contain data for read and write or a program for a run file for application execution, or an Application Definition File (ADF), 1660. The ADF, which includes a File Allocation Table (FAT), defines an application structure.

Typically, a Public Key system is regulated by a Certification Authority or an agent of the Certification Authority (CA) whose Public Key is typically programmed into the main application of the TCE for certificate validation.

Applications (new directories) are programmed into the TCE. Each application has its own Application Definition File (ADF), 1660. Each application is owned by an application issuer and contains the files belonging to the application.

The non-volatile read-write memory of the TCE's SAM, 1670, typically has three separated logic partitions. The first secured partition, 1640, consists of the TCE SAM's initialization and personalization data comprising of the TCE SAM's certificate, which is signed by the Certification Authority, the TCE SAM's keys; an optional PIN to initially activate the TCE's SAM; and Option bytes, which are operable to limit cryptographic functions, as prescribed by governments.

The second partition, 1670, is intended for the File Definition Tables (FDTs), 1650. FDTs which point to Elementary Files (EF), e.g., 1610, 1630, or Application Definition Tables (ADFs), e.g., 1660.

The EFs may reside in the third logic partition, 1680 of the EEPROM, 40, or in the Memory Storage Extension (MSE), 20 of FIG. 4 or 320 of FIG. 5. Frequently updated EFs typically reside in the TCE SAM's EEPROM, 40. ADF typically reside in the third logic partition, 1680. Typically, the data and executable files, for each application are defined in the EEPROM of the TCE, 40.

Figure 7:
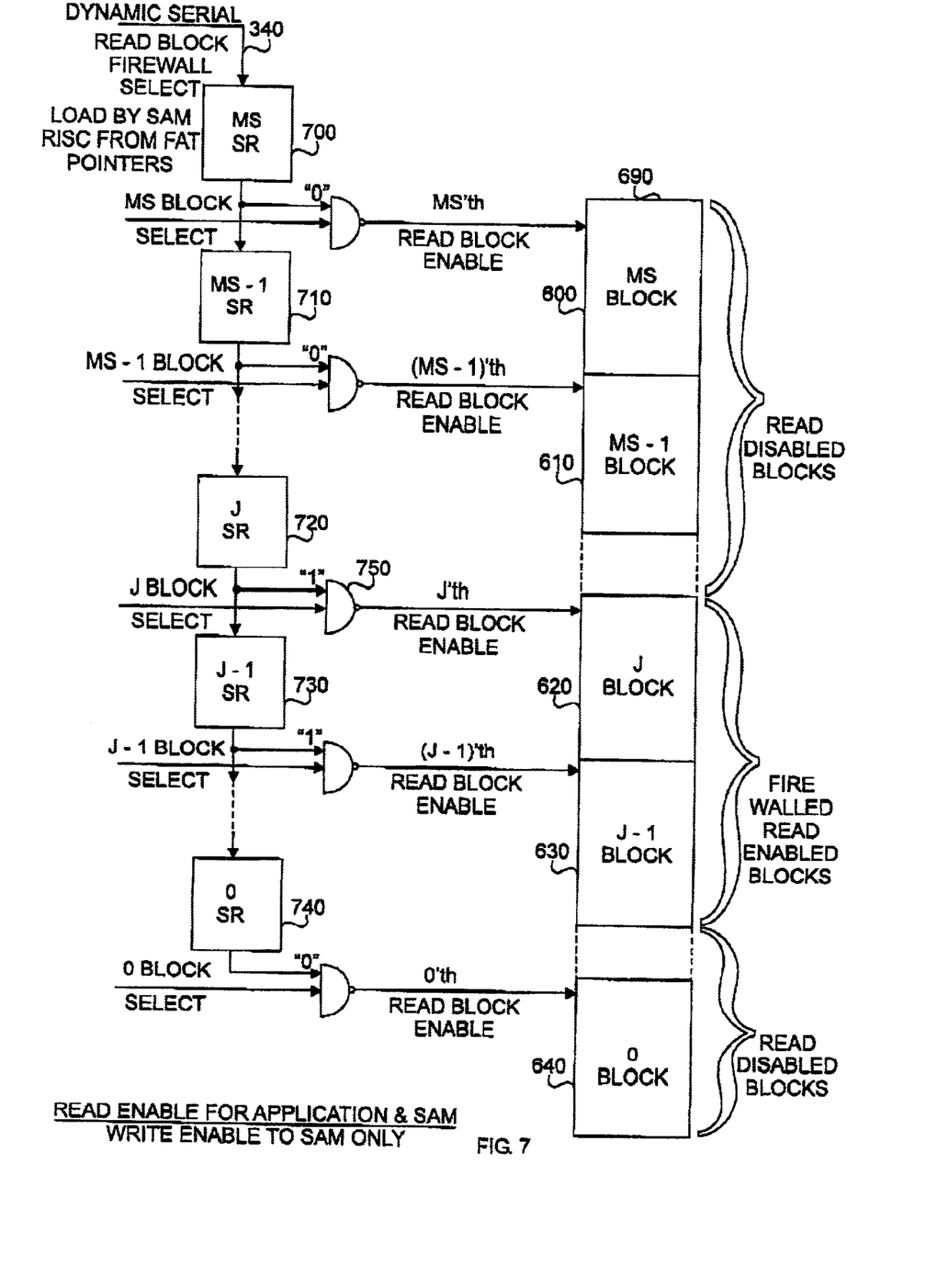
FIG. 7 is a preferred embodiment of an access control enable vector for masking the access by an application fetched from NOR Flash memory.

FIG. 7 is a preferred embodiment of a control vector mechanism operable to regulate access to executable NOR type Flash memory. A typical Application Definition File 1660 of FIG. 6, typically defines the bounds of an application with pointers in the TCE SAM EEPROM which relate to the bounds of the licensed application, or an authorized part thereof. Typically, the TCE SAM assembles and loads the Firewall Select Vector typically as defined in the Application Definition File.

In a preferred embodiment, the Firewall Select Vector is serially fed into a serial-in/parallel-out shift register, cells of which are depicted in 700, 710, 720, 730, and 740. The shift register is interleaved into the address decoder of the Random Access Application Flash ROM, 320 of FIG. 5. In this preferred embodiment, the memory is parsed into blocks. Typically, a block is enabled to be read when the decoded Block Select of the ROM Flash, 320, points to a block with a "1", AND the output of a cell of the shift register is a "1", 750. Typically, a "0" output of a shift register cell of the firewall select vector masks out a block of memory, thereby typically disabling access during an application session.

Typically, specific application blocks will contain only code and data relating to the same application. Blocks of memory in 690, typically depicted as 600, 610, 620, 630, and 640, are typically of equal size.

Figure 8:
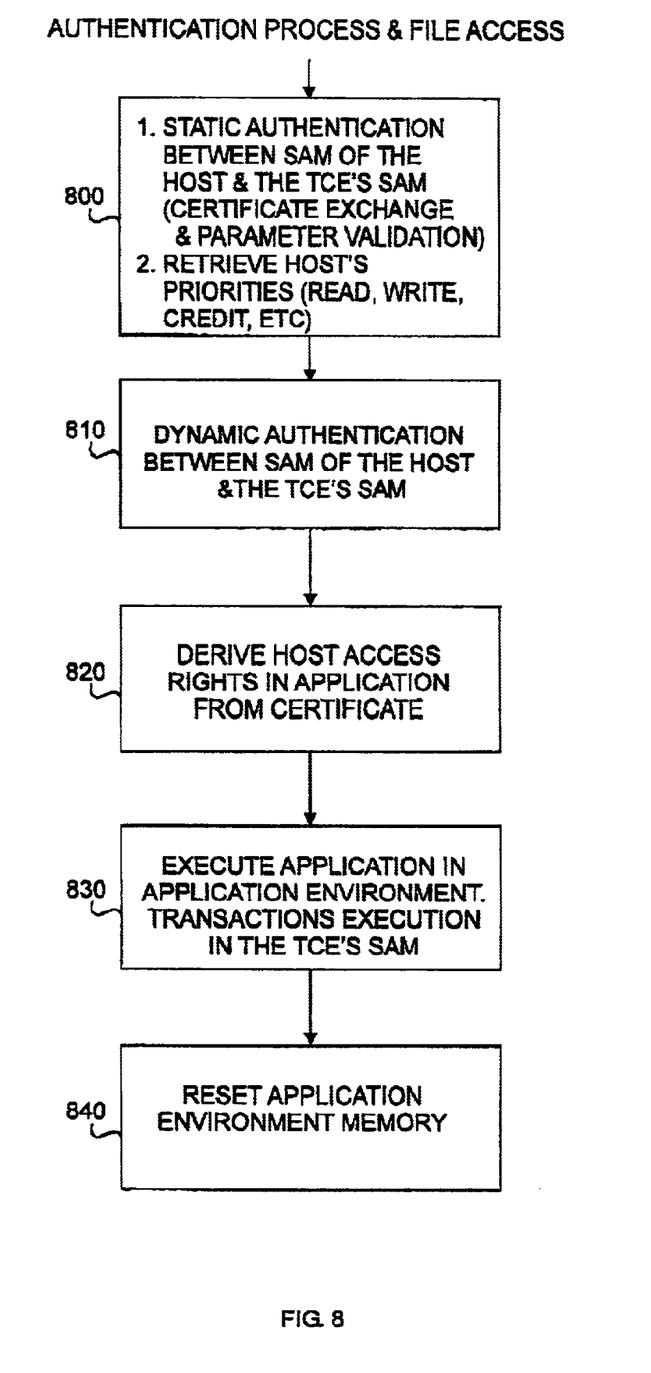
FIG. 8 is a flow chart demonstrating the process of authentication and of regulated file access

FIG. 8 is a simplified flow chart describing the Authentication Process & File Access procedure. Typically, in a PKI authentication process two members of an application are operable to communicate after mutual positive PKI identification.

At the conclusion of the process, the TCE SAM and Host SAM have negotiated their common application, have established file access permission, and have typically generated a DES session key for confidential data exchange.

The Certificate Exchange Process, 800 proves the existence of entities in an application. Validation of the host's SAM certificate proves to the TCE's SAM that there is a host authorized by the CA, whose public key is used to validate the Host's SAM and status. Public Key Verification, 810 typically proves the identity of the Host's SAM and TCE's SAM in preparation for executing an authorized application.

Access Rights to an Application, 820 for Read and Write Security Levels are typically defined in the File Definition Table (FDT), 1650. Typically, the Security Level defines which key(s) are required for a license to access files, wherein priorities are defined for reading and writing. Typically, the host sends commands to the TCE's SAM, operable to execute application in the application environment, 830. The TCE's SAM allocates application memory partition to the TACE.

Prior to executing an application, all-volatile memory is typically reset, 840.

Figure 9:
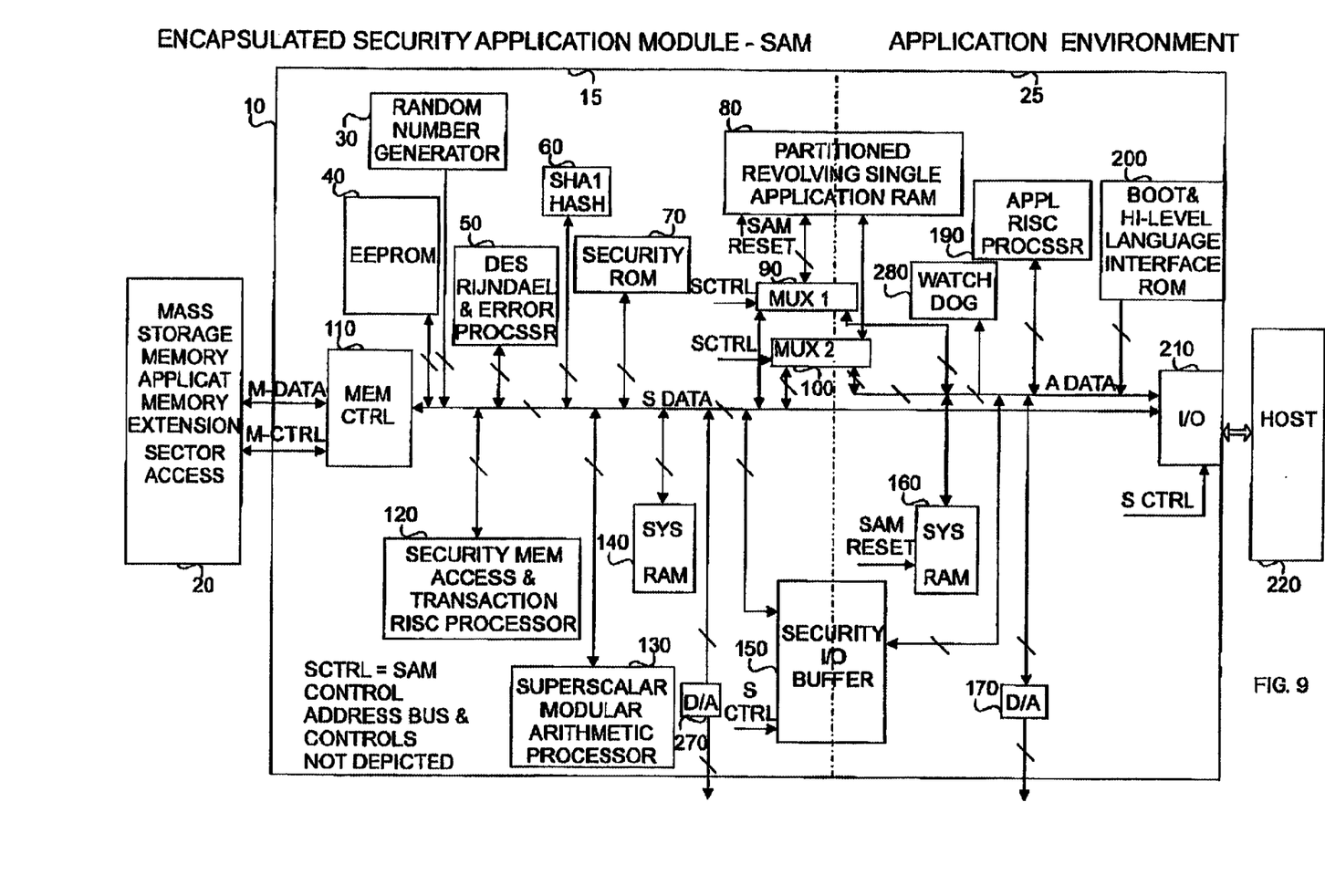
FIG. 9 is a block diagram of a multi-media synchronized application operable to output a plurality of synchronized analog signals.

FIG. 9 is a generic simplified block diagram representation of a preferred embodiment of a multi-media synchronized application configuration of double computing processor Public Key protected Trusted Computing Environment, TCE, 10, comprised of a security application module, SAM, 15, with an appended Trusted Application Computing Environment, TACE, 25. The TCE, 10, communicates with a Host computing device, 220, operative to activate the TCE, and to enable authorized usage of the TCE operable subsequently to input raw digital data preferably in clear text to be processed in the TACE environment. The Host data stream would typically be unenhanced purchased image data. Simultaneously, the TCE SAM typically decrypts purchased entertainment audio data interleaved with image enhancement parameter data from the Mass Storage Memory, 20, operable to synchronize audio data with image data in the application environment, 25.

In a preferred embodiment the encrypted data stream from the mass storage memory, 20, would typically include a dubbed in sound track of the purchased movie wherein the unenhanced image data is typically recorded on CDROM disks.

The analog audio outputs are typically output on stereo DIAs, 270, and the enhanced synchronized images are output on 170.

An attacker is able to copy the analog data on outputs 170 and 270, but is typically unable to retrieve quality digital data.

Figure 10:
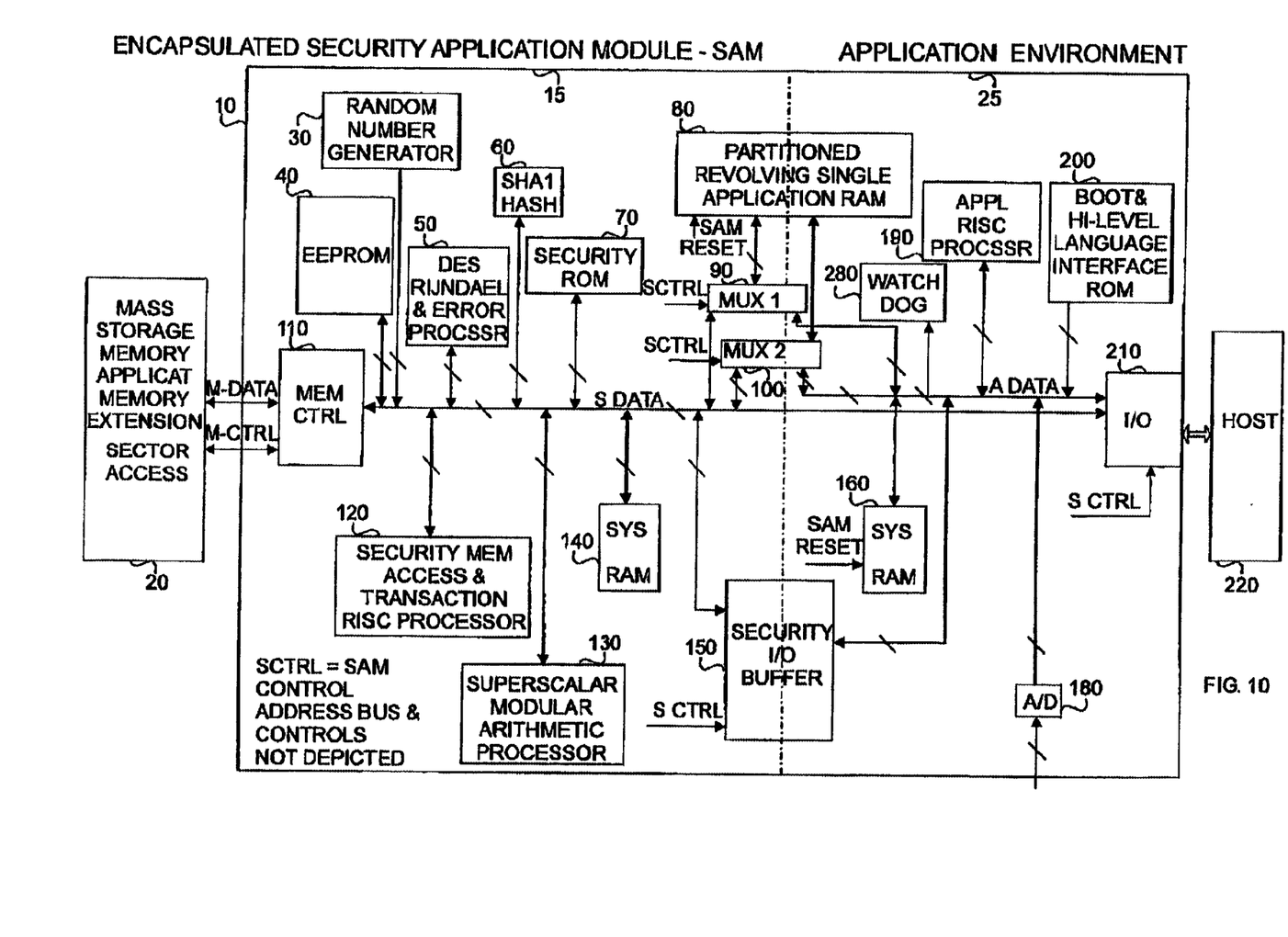
FIG. 10 is a block diagram of a trusted computing environment (TCE) operable to process biometric inputs for user authentication.

FIG. 10 is a block diagram of a preferred embodiment of a double computing processor Public Key protected Trusted Computing Environment, TCE, 10, comprised of a security application module, SAM, 15, with an appended Trusted Application Computing Environment, TACE, 25. The TCE, 10, communicates with a Host computing device, 220, operative to activate the TCE, and to enable authorized usage of the TCE. An additional A/D converter operable to assemble an image is integrated into the TACE, wherein the image is typically stored in the local TACE RAM.

The configuration with an A/D input is typically operable to execute fingerprint identification. The TACE typically enhances the input image wherein blemishes, unconnected lines and curves are repaired. Features are typically extracted from the fingerprint image and the proximity of the measured image is compared with a stored feature template in the application memory to statistically authenticate personal identification.

What is claimed is:

1. A system for supporting mutually exclusive program execution, the system comprising:
   a first component operable to provide authorized access to secured repositories of data and programs, to prevent one application from utilizing, scrutinizing or modifying another application,
   a second component operable to execute programs loaded from or residing in said repositories of programs and accessing said repositories of data,
   said first and second components operating in parallel,
   wherein the first component comprises a SAM; and
   wherein the second component comprises a computing application environment, separated from the SAM by SAM-access controlling rules, and operable to execute operations, use of which is regulated by the SAM, on at least one of the following: downloaded data downloaded from said repositories by said SAM; and firewall-protected random access data;
   wherein the use of the downloaded data by the computing application environment, and access of the computing application environment to the downloaded data, are regulated by the SAM;
   and wherein the firewall-protected random access data is stored in memory which is made accessible to said computing application environment only by the SAM.

2. The system of claim 1, containing a coordination medium, said coordination medium being operable to conveying information between a plurality of sub-modules within said system, and being operated in compliance with a security rule whereby said coordination medium is detached from the control of any program loaded from or residing in said repositories of programs whenever said coordination medium is attached to said data repositories.

3. The system of claim 1, wherein said repositories of programs are operable to fetch for execution portions of a complete program during program run time.

4. The system of claim 3, wherein fetching of portions of a program are subject to a mask controlled by said first component, said mask being a plurality of control values determining which parts of said repositories of programs are operable in an application session.

5. The system of claim 1, operable in a mobile communication device.

6. The system of claim 1, implemented on a single monolithic microelectronic circuit.

7. The system of claim 1, wherein traffic of information between parts of the system that do not reside on a common monolithic microelectronic integrated circuit is typically encrypted.

8. The system of claim 1, also comprising apparatus for personal identification.

9. A system according to claim 1, wherein at least one analog input to the application environment is operative to input analog data.

10. A system according to claim 9, wherein said input data corresponds to an image.

11. A system according to claim 10, wherein said image is derived from the output of a fingerprint detector operative to provide data for feature extraction.

12. A system according to claim 10, wherein fine tuning portions of visual data residing in the data repository are intertwined with audio data in the SAM and are typically operative to enhance visual data input in the clear from a host, to thereby typically prevent quality duplication of the visual data.

13. A system according to claim 9, wherein the analog data corresponds to a voice message.

14. A system according to claim 13, wherein features are extracted from the voice message in order to identify a speaker of the voice message.

15. A system according to claim 9, wherein visual data is input in clear text to the application computing environment and is synchronized with audio data which is decompressed by the system wherein both visual and audio data are output simultaneously in separate streams to a display device.

16. A system according to claim 1, wherein the fingerprint detector is operative to prepare a feature template to identify the possessor of said fingerprint and wherein said sensed feature template is compared to at least one stored feature template residing in the secured repositories.

17. A system according to claim 1, wherein previous to initializing an application session no application data pertaining to a previous application session remains in the application environment.

18. A system according to claim 1, wherein said repositories of data and programs comprises executable memory and data memory and wherein following an application session, said executable memory and data memory are reset.

19. A system according to claim 1, wherein at least a portion of the first and second components are embedded in smart cards.

20. A system according to claim 1 wherein at least a portion of the first and second components are embedded in subscriber identification modules of mobile communication devices.

21. A system according to claim 1 wherein at least a portion of the first and second components are operable to enhance security and functionality in computer network servers.

22. A system according to claim 1 wherein at least a portion of the first and second components are operable to enhance security and functionality of mass storage devices.

23. A system according to claim 1 wherein at least a portion of the first and second components are operable to enhance security and functionality of computing devices.

24. A system according to claim 1 wherein at least a portion of the first and second components are operable to enhance security and functionality of computing devices.

25. A system according to claim 1 wherein the system is operative to authenticate the validity and integrity of multi-origin data files.

26. The system of claim 1, embedded within a wireless communication device.

27. The system of claim 1, serving a credit or debit charge card clearance scheme.

28. The system of claim 1, operative to display flight schedule, to reserve flights, to ticket flights, and to clear payments for airline services.

29. A method for supporting mutually exclusive program execution, the method comprising:
   providing a first component operable to provide authorized access to secured repositories of data and programs, to prevent one application from utilizing, scrutinizing or modifying another application; and providing a second component operable to execute programs loaded from or residing in said repositories of programs and accessing said repositories of data, said first and second components operating in parallel, wherein the first component comprises a SAM; and wherein the second component comprises a computing application environment, separated from the SAM by SAM-access controlling rules, and operable to execute operations, use of which is regulated by the SAM, on at least one of the following: downloaded data downloaded from said repositories by said SAM; and firewall-protected random access data;

wherein the use of the downloaded data by the computing application environment, and access of the computing application environment to the downloaded data, are regulated by the SAM;

and wherein the firewall-protected random access data is stored in memory which is made accessible to said computing application environment only by the SAM.

30. The method of claim 29 wherein said access to repositories is controlled based on public key encryption.

31. The method of claim 29 wherein said authorized access is based on public key encryption.

32. A method according to claim 29, wherein applications are exclusively authorized by a certified authority identifiable to the SAM, whereby such authority's public key is immutably programmed into a non-volatile memory in the SAM, wherein confidential client programs are licensed to be programmed into, updated and improved after verifiable certification of said authority.

33. A method according to claim 29 wherein a plurality of authorities are licensed to program applications into a non-volatile memory.

34. A method according to claim 29 wherein at least one analog input to the application environment is operative to input analog data.

35. A method according to claim 34 wherein said input data corresponds to an image.

36. A method according to claim 35, wherein said image is derived from the output of a fingerprint detector operative to provide data for feature extraction.

37. A method according to claim 35, wherein fine tuning portions of visual data residing in the data repository are intertwined with audio data in the SAM and are typically operative to enhance visual data input in the clear from a host, to thereby typically prevent quality duplication of the visual data.

38. A method according to claim 34 wherein the analog data corresponds to a voice message.

39. A method according to claim 38, wherein features are extracted from the voice message in order to identify a speaker of the voice message.

40. A method according to claim 34, wherein visual data is input in clear text to the application computing environment and is synchronized with audio data which is decompressed wherein both visual and audio data are output simultaneously in separate streams to a display device.

41. A method according to claim 29, wherein the fingerprint detector is operative to prepare a feature template to identify the possessor of said fingerprint and wherein said sensed feature template is compared to at least one stored feature template residing in the secured repositories.

42. A method according to claim 29, wherein previous to initializing an application session no application data pertaining to a previous application session remains in the application environment.

43. A method according to claim 29, wherein said repositories of data and programs comprises executable memory and data memory and wherein following an application session, said executable memory and data memory are reset.

44. A method according to claim 29, wherein at least a portion of the first and second components are embedded in smart cards.

45. A method according to claim 29, wherein at least a portion of the first and second components are embedded in subscriber identification modules of mobile communication devices.

46. A method according to claim 29 wherein at least a portion of the first and second components are operable to enhance security and functionality in computer network servers.

47. A method according to claim 29 wherein at least a portion of the first and second components are operable to enhance security and functionality of mass storage devices.

48. A method according to claim 29 and also comprising authenticating the validity and integrity of multi-origin data files.

* * * * *

UNITED STATES PATENT AND TRADEMARK OFFICE
CERTIFICATE OF CORRECTION

PATENT NO. : 6,749,115 B2
DATED : June 15, 2004
INVENTOR(S) : Carmi D. Gressel

It is certified that error appears in the above-identified patent and that said Letters Patent is hereby corrected as shown below:

<u>Title page</u>,
Insert Item:

-- [30]   Foreign Application Priority Data

Israel         140267         December 13, 2000 --

Signed and Sealed this

Thirtieth Day of November, 2004

JON W. DUDAS
*Director of the United States Patent and Trademark Office*